United States Patent [19]

Garber

[11] 3,965,004

[45] June 22, 1976

[54] REMOVAL OF CONTAMINANTS FROM WATER

[75] Inventor: Daniel C. Garber, Overbrook Hills, Pa.

[73] Assignee: Sun Shipbuilding & Drydock Company, Chester, Pa.

[22] Filed: Jan. 30, 1975

[21] Appl. No.: 545,640

Related U.S. Application Data

[63] Continuation-in-part of Ser. No. 305,630, Nov. 10, 1972, abandoned.

[52] U.S. Cl. .......................... 210/73 W; 196/14.5; 208/28; 208/188; 210/257 R; 210/259; 210/282; 210/DIG. 5
[51] Int. Cl.² ........................................ C10G 43/04
[58] Field of Search ........... 196/14.5, 46.1; 208/28, 208/29, 187, 188, 310; 210/23 R, 40, 73 W, 83, 172, 252, 257, 259, 265, 266, 282, 513, 515, DIG. 5; 252/360

[56] References Cited
UNITED STATES PATENTS

| | | |
|---|---|---|
| 1,649,103 | 11/1927 | Egloff et al. ...................... 252/360 |
| 2,864,502 | 12/1958 | May ................................. 210/252 X |
| 2,922,750 | 1/1960 | Price ................................ 196/46.1 |
| 3,645,398 | 2/1972 | Fiocco ............................. 21/73 W |
| 3,674,684 | 7/1972 | Gollan ............................. 21/40 X |
| 3,769,199 | 10/1973 | Groszek et al. ................. 208/28 |
| 3,862,026 | 1/1975 | Friend et al. .................... 208/28 X |

*Primary Examiner*—Charles N. Hart
*Assistant Examiner*—Robert G. Mukai
*Attorney, Agent, or Firm*—J. Edward Hess; Donald R. Johnson; Paul Lipsitz

[57] ABSTRACT

In a system for removing oil from oily water which employs an oil droplet coalescer, a ceramic dewaxer is inserted before the coalescer to remove waxes, asphalts, and similar materials which would otherwise quickly clog the fine holes of the coalescer. The "dirty" ceramic elements of the dewaxer may be easily and efficiently regenerated.

9 Claims, 5 Drawing Figures

REMOVAL OF CONTAMINANTS FROM WATER

CROSS REFERENCE TO RELATED CASES

This application is a continuation-in-part of application Ser. No. 305,630, filed Nov. 10, 1972, and now abandoned.

This invention relates to the removal of contaminants from water, and more particularly to the removal of oil, as well as particulate matter, from oily water.

The contaminant-removal system of this invention is particularly applicable to oil tankers. In tankers running under ballast, the ballast water becomes contaminated with oil. Also, the engine room bilge water is oily, and the liquid cleaning of the cargo tanks results in the production of slop, which is oily. These various oily waters also commonly contain particulate matter such as silt, rust, waxes, asphalts, etc. Before this ballast, bilge water, or slop is discharged overboard from the tanker, it is essential, or at least highly desirable, that substantially all of the oil be removed therefrom, as well as the particulate matter. The main reason for this is to avoid pollution of the rivers and oceans. By way of example, it may be desired to reduce the oil content of the water to be discharged overboard to less than about six parts per million.

An object of this invention is to provide a novel oil-water separator system.

Another object is to provide a system for removing contaminants from water which operates more efficiently and effectively than prior, known systems.

A further object is to provide, in an oil-water separator system which utilizes as the final element a fine hole size coalescer for the oil droplets, an arrangement which substantially increases the service life of the coalescer, thus greatly increasing the overall efficiency and effectiveness of the system and making it highly practical.

A still further object is to provide, in an oil-water separation system utilizing a coalescer, a means for removing waxes, asphalts, gums, and similar materials from the liquid influent fed to the coalescer.

Yet another object is to provide a novel type of dewaxer for an oil-water separation system.

An additional object is to provide a wax-removing device for streams (i.e., a dewaxer acting to absorb and retain the wax) which may be readily regenerated or renewed when it is near to or at the limit of its wax-absorbing capacity.

The objects of this invention are accomplished, briefly, in the following manner:

The oily water is first passed through an oil-water separator such as a gravity-type which provides a rough separation of the oil and water. The effluent from this unit is pumped through a ceramic dewaxer containing porous ceramic pellets. Waxes, asphalts, gums, and similar materials in the separator effluent (influent for the dewaxer) impinge upon and are retained by these pellets, which may be regenerated when necessary. Effluent from the dewaxer is passed through means to remove particulate matter such as a sand filter and then through a coalescer, which coalesces the remaining oil droplets to complete the oil-water separation.

A detailed description of the invention follows, taken in conjunction with the accompanying drawings, wherein.

Figure 1:
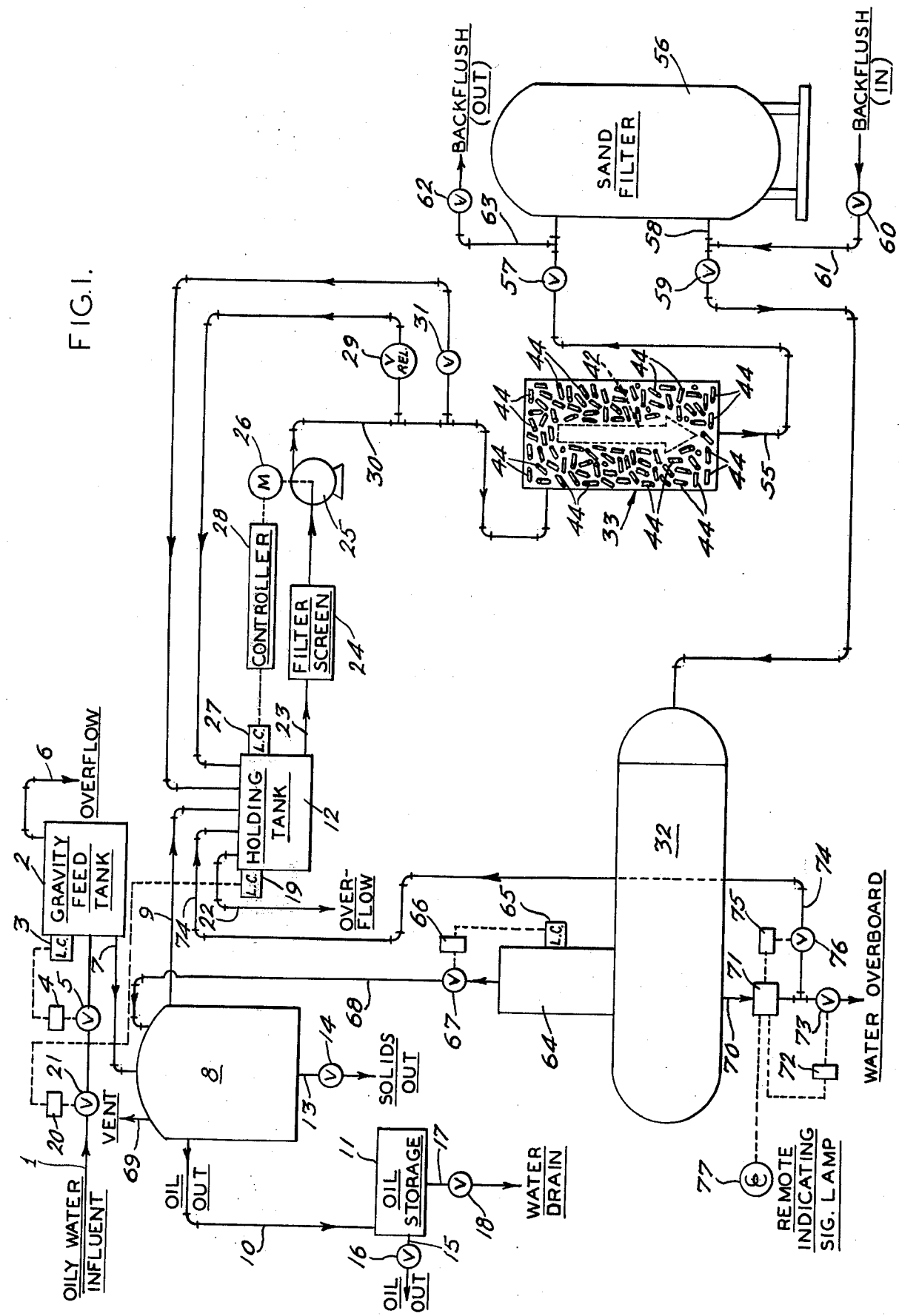
FIG. 1 is a schematic representation of an oil-water separation system according to the present invention, drawn in the form of a process flow diagram.
Figure 2:
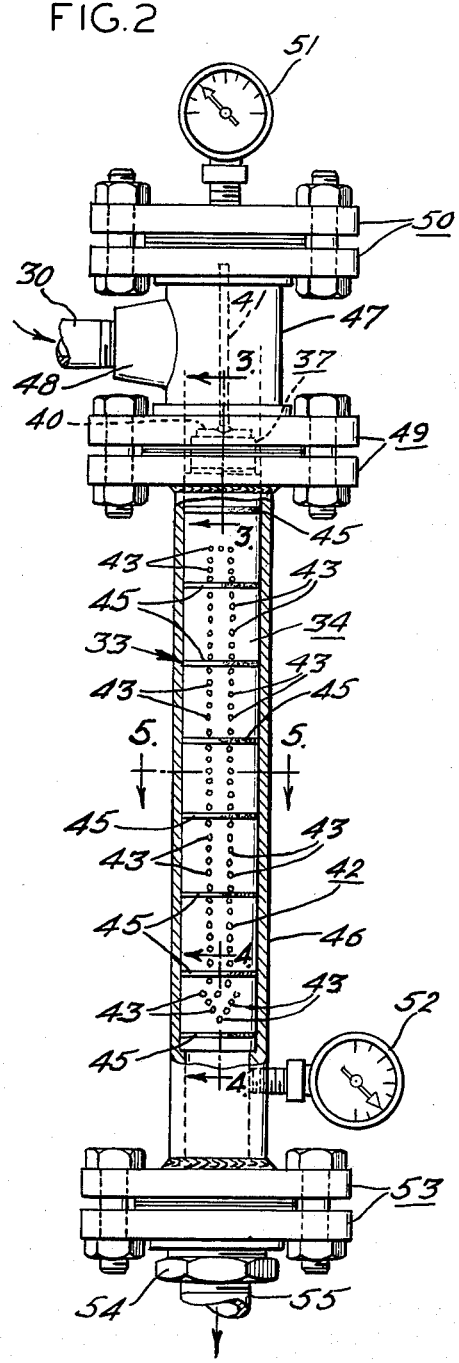
FIG. 2 is an elevational view, partly in section, of one of the components of FIG. 1.
Figure 3:
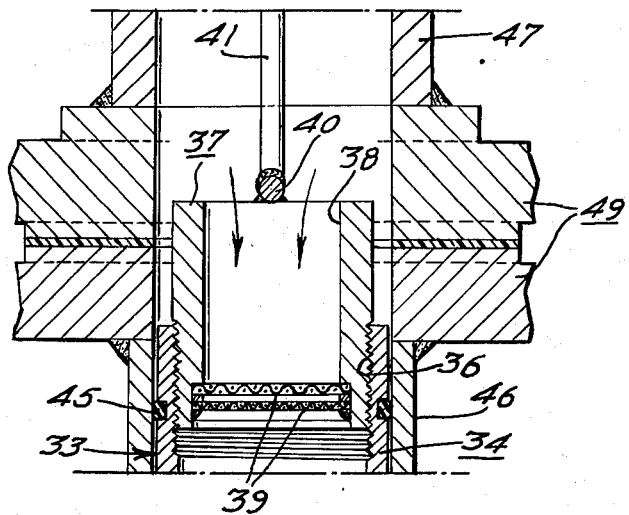
FIG. 3 is a cross-section taken on line 3—3 of FIG. 2 and drawn on an enlarged scale.
Figure 4:
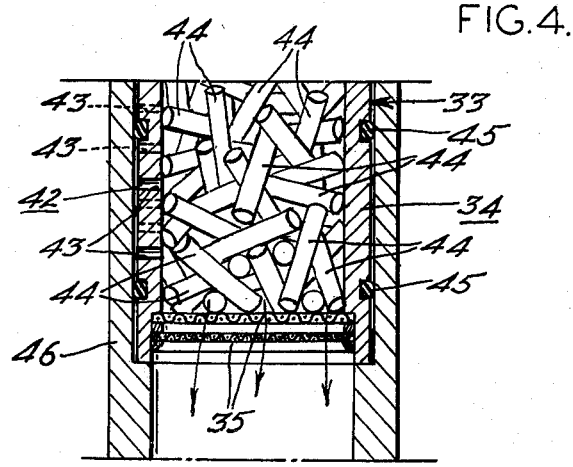
FIG. 4 is a cross-section taken on line 4—4 of FIG. 2 and drawn on an enlarged scale.
Figure 5:
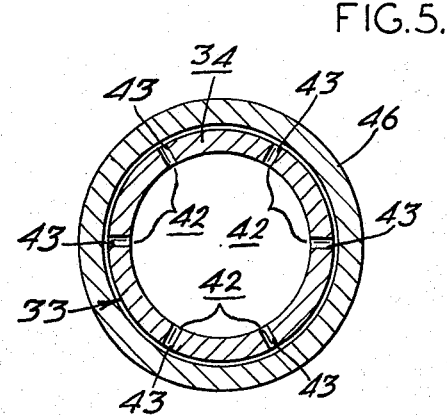
FIG. 5 is a cross-section taken on line 5—5 of FIG. 2 and drawn on an enlarged scale.

In general, it may be stated that the system of this invention processes any oil-water mixture through its various components or units to effect an essentially complete separation of the oil and water, using only physical processes, without any recourse to heat or chemicals. Refer now to FIG. 1. The oily water influent for the separation system, which may comprise the ship's ballast, or slop or bilge water stored in tanks aboard the ship, is pumped through a line 1 toward and into a gravity feed tank (storage tank) 2, by means of a pump (not shown; usually a centrifugal pump) installed on the ship. A level controller 3 (which may be of the conventional float type), installed on tank 2, controls the valve operator 4 of a valve 5 in line 1 in such a way as to normally prevent overflow of tank 2. An emergency overflow pipe 6 leads from the top of tank 2 to the bilge or slop tank or tanks.

The contaminated water flows by gravity from tank 2 through a line 7 to the first processing unit or component 8. This unit is a gravity-type oil-water separator operating on the density difference between oil and water, and providing a rough separation of the oil and water. The separator 8 may, for example, be a "Model DE-5 Separator," manufactured by Butterworth System, Inc. of Bayonne, New Jersey. It operates at ambient temperatures and requires only gravity flow throughout. Under favorable operating conditions, the nominal separatory refinement capability of unit 8 is approximately 100 parts per million oil, which is to say that the oil content of the effluent from this unit (in the effluent line 9) may be reduced by the unit to approximately 100 parts per million. The capability mentioned varies somewhat with the type and amount of oil in the influent (line 7) to this unit.

In the interest of completeness, a brief description of the structure and mode of operation of separator 8 will now be given. This unit is a three-stage gravity-type unit utilizing fins or vanes to promote the coalescing of the larger oil droplets which then rise to the top, agglomerate and overflow weirs leading to the oil outlet pipe 10. It may be noted here that this oil outlet pipe leads to an oil storage tank or reservoir 11. The deoiled watery effluent overflows a central conically topped standpipe and then exits through the water outlet pipe 9 to a pump holding tank 12. The oil overflow weirs are set hydraulically (vertically) higher than the overflow edges of the water standpipe, in order to pass the oil but retain the water.

The only servicing required by the separator 8 is periodic cleaning. A line 13 and valve 14 are provided for draining liquid or for the removal of collected solids from the separator 8. For effective operation, the flow through separator 8 should not exceed its rated capacity.

A particularly useful characteristic of the separator 8 is its capability of completely bypassing to the oil outlet 10 an influent stream (to this unit) comprising 100% oil. Thus accidental or random "flooding" of downstream units of the separation system is avoided.

A line 15 and valve 16 are provided for removing oil from the reservoir 11. In addition, a bottom drain line 17 and valve 18 are provided for draining out water which may accumulate in reservoir 11.

The first processing unit (separator device) 8, operating at ambient temperatures, will provide an effluent (at 9) consisting of water plus the following items:

a. neutrally buoyant particles large enough to be screenable, and that might interfere with effective pump operation if not filtered out;

b. neutrally buoyant particles (e.g., silt) too small to be screenable;

c. neutrally buoyant globules consisting of fine metal particles encased in oil;

d. neutrally buoyant waxes, asphalts, and similar materials that quickly clog porous filtration media such as fine hole size coalescers and porous ceramic filtration media;

e. microscopic oil globules in the micron and submicron size ranges, whose settling-out rates due to density differences would result in prohibitively long residence times in the settling-out chamber 8.

The pump holding tank 12 is provided with a level controller 19 (holding tank overfill float control) which controls the valve operator 20 of a valve 21 in line 1, upstream from valve 5. An emergency overflow pipe 22 leads from the top of tank 12 to the bilge or slop tank or tanks.

The deoiled water in the holding tank 12 is fed by means of a line 23 through a filter screen 24 to the intake side of a pump 25. The filter screen 24 separates out item "a" above, thus protecting pump 25.

Pump 25 (illustrated as of centrifugal type, though it may be reciprocating) functions to pressurize the oily water stream (deoiled effluent from the separator 8) exiting from the holding tank 12, in order to force this stream through the subsequent components. Pump 25 is driven by a motor 26 adapted to obtain its power from a steam, a compressed air, an alternating current, or a direct current source. Pump 25 is activated by a float control sensor (level controller) 27 in the holding tank 12, which controls a motor controller 28 for motor 26. It may be noted that the float of controller 27 is set lower than the float of controller 19, so that pump 25 will be activated before valve 21 is operated.

The system is protected against overpressurization by a pressure relief valve (safety valve) 29 which is connected between the discharge side of pump 25 (line 30) and the upper portion of tank 12.

The desired (designed) net flow for the system is obtained by means of a flow control bypass valve 31, connected between line 30 and the upper portion of tank 12.

A coalescer 32, to be described in more detail hereinafter, comprises the final unit of the separation system of the invention; this unit operates on the microscopic oil globules described in item "e" above. However, as stated in item "d" above, waxes, asphalts, gums, and similar materials quickly clog fine hole size coalescers, as well as porous ceramic filtration media. If these contaminants are also neutrally buoyant, they cannot be removed from the (coalescer) influent by the separator 8. Therefore, according to this invention, a ceramic dewaxer, the cartridge of which is denoted by numeral 33, is inserted upstream or ahead of the coalescer 32. In this connection, it is desired to be pointed out that the name "ceramic" dewaxer indicates that a ceramic filtration medium is used in the dewaxer. The ceramic dewaxer basically functions to separate out all of item "d" above, thus preventing this material from reaching and clogging the coalescer. The ceramic dewaxer also separates out some of items "b" and "c" above.

For simplicity, only the cartridge of the ceramic dewaxer is illustrated at 33 in FIG. 1. Refer now to FIGS. 2–5. The ceramic dewaxer cartridge comprises a stainless steel tube 34, open at both ends, with a stainless steel wire cloth screen 35 covering one end and fixed to it by welding. The other end of tube 34 has a set of female threads 36 which mate with the threads on a removable stainless steel plug 37 having a central bore 38 the inner end of which is covered with a stainless steel wire cloth screen 39 fixed to the plug by welding. A round stainless steel bar 40 is welded across the open outer end of the hollow plug 37, and one end of a positioning rod 41, which extends outwardly, in the axial direction of the plug, is welded to bar 40.

The tube 34 has lengthwise arrows 42 on it, indicating the direction of normal fluid flow during operation, these arrows being formed by drilling small holes 43 through the tube wall. Holes 43 also serve to vent the gas formed during the wax burn-out operation (this will be described later). These holes (about ⅛-inch in diameter) and the openings in the wire cloth screens 35 and 39 are small enough to ensure that the ceramic pellets 44 (which are packed into tube 34) are always retained in the tube and between the wire cloth screens.

To load the tube 34, the threaded plug 37 is removed, the ceramic pellets 44 are randomly inserted to the proper level, and then the tube is vibrated to obtain maximum compaction, following which the plug 37 is tightly screwed home. This constitutes the ceramic cartridge 33.

A preferred embodiment of the ceramic pellets 44 is a solid, cylindrical configuration, 0.205 inches in diameter by 1¼ inches long. Although a cylindrical shape is generally preferred, the pellets could be of various other shapes. The material is a special formulation of abrasive, similar to that used for abrasive deburring of metal parts by barrel tumbling a mixture of the abrasive pellets and the metal parts. It is a very porous material, with open pores. Typically the porous ceramic material will be a fired, but unglazed clay, but it will be understood that other porous clay-type materials are equivalent. A supplier of the preferred ceramic material is ALMCO-Queen Products Division of King-Seeley Thermos Co., located in Albert Lea, Minnesota.

Tube 34 has in its outer wall a plurality (illustrated as eight in number) of parallel, spaced, circumferentially-extending O-ring grooves, in each of which there is mounted a respective O-ring 45.

To install the ceramic cartridge 33 in the separation system, a flanged outer pipe 46 is utilized. A pipe extension 47 having a side fluid fitting 48 welded thereto is attached to one end of pipe 46 by means of a flanged coupling 49 including a pair of flanges one of which is attached to pipe 46 and the other of which is attached to pipe extension 47. The fitting 48 provides a fluid inlet for the dewaxer, and this fitting is connected to the pump discharge line 30.

A flanged coupling 50, including a flange attached to pipe extension 47 and an outer blind flange, serves to provide an outer closure for pipe extension 47. The blind flange of coupling 50 has a pressure tap therein for an inlet pressure gauge 51. The coupling 50 may be uncoupled to position the ceramic cartridge 33 within the pipe 46. The O-rings 45 on tube 34 provide a seal between the outer wall of tube 34 and the inner wall of pipe 46, to prevent any bypassing of the cartridge interior by the fluid pumped into inlet 48. The cartridge 33 is mounted within pipe 46 so that the pump discharge (which is in reality the effluent from the separator 8) flows through the cartridge in the direction of the arrows 42.

Adjacent the opposite end of pipe 46, this pipe has a pressure tap therein for an outlet pressure gauge 52. A flanged coupling 53, including a flange attached to pipe 46 and an outer screwed flange, is provided at the other end of pipe 46. The screwed flange referred to has a central bushing 54 to which a line 55 is coupled. Line 55 serves as the outlet line for the ceramic dewaxer, while line 30 serves as the inlet line for the dewaxer.

As previously stated, the pressurized oily water output from the pump 25 flows through the ceramic dewaxer in the direction of the arrows 42 on the ceramic cartridge 33. The ceramic dewaxer separates out the waxes, asphalts, gums, and similar materials (which quickly clog porous ceramic filtration media) by virtue of the fine pores within the bodies of the ceramic pellets or cylinders 44 becoming clogged therewith. Specifically, the oily water stream, in passing through the perforated (at its ends) stainless steel ceramic dewaxer cartridge 33, is constrained to course back and forth as it flows through the constricted passageways formed by the tightly compacted cylindrical ceramic pellets. In so doing, the waxy, asphaltic, and gummy type materials described in item "d" above impinge upon and are retained in the open pores that are peculiar to the abrasive ceramic structure. Some of the other materials, also, are retained on this structure. It may be noted here that pellets of other shapes than cylindrical will provide similar constricted passageways, through which the oily water may course back and forth.

During operation, prior to the ceramic cartridge's becoming fully "loaded up" with the above-described contaminants the cartridge 33 is replaced with a "clean" one, and the "dirty" cartridge is processed through one or more of the following regeneration steps.

1. The "waxy" material is burned off the pellets by placing the ceramic cartridge inside a boiler, near the bottom of the combustion zone. This may be effected, for example, by utilizing a stainless steel insertion tube which extends into the boiler combustion zone and which is adapted to receive and retain the ceramic cartridge while allowing the boiler heat to "bake out" the waxy materials which have been collected by the ceramic pellets 44. As previously stated, the holes 43 which form the arrows 42 serve to vent the gas formed during the wax burn-out operation. It will be understood that the tube 34 complete with its load of dirty pellets, is placed inside the boiler for this mode of regeneration.

2. Alternatively, or in addition to the baking out, the ceramic cartridge 33 may be placed in a high pressure, high temperature pipe line through a bolted flange, and then cleaned with superheated steam which flows through the cartridge in a direction opposite to that indicated by the "operational flow" arrows 42.

3. Alternatively, or in addition to the above-mentioned cartridge regeneration processes, the ceramic cartridge can be processed by a solvent cleaning operation, utilizing an agent such as trichlorethylene, or other solvents, or caustic.

4. Alternatively, or in addition to the above-mentioned cartridge regeneration processes, the ceramic pellets 44 can be removed from the cartridge 33 and cleaned in acid, by dumping them into an acid vat in order to remove metal particles.

5. Alternatively, or in addition to the previously-mentioned cartridge regeneration processes, the pellets may be wet with water and then exposed to microwave energy, for example in a microwave oven. In this case, the microwave energy flashes the water in the pores into steam, which then pushes the dirt out of the pores.

6. Alternatively, the "spent" ceramic pellets 44 are discarded and the cartridge repacked with new pellets at low cost. However, by virtue of all of the previously-mentioned steps, the mean time between replacement of materials is considered to be very long.

Although the previous description has referred to a single ceramic cartridge 33 inside a pipe 46, to provide for increased rates of flow multiple cartridges (i.e. a plurality of cartridges) may be utilized within a single pressure vessel. In this case, a manifolded flow arrangement may be employed, wherein all of te cartridges are paralleled insofar as the flow is concerned.

Another contaminant (in addition to the waxes, asphalts, gums, and similar materials, which are removed from the stream by the ceramic dewaxer) inimical to the continued operation of the coalescer 32 is waterborne silt. Some of this material passes through the separator 8 and the ceramic dewaxer and, absent any means to eliminate it from the coalescer influent, would be retained by and thus clog the coalescer.

In order to remove from the stream and retain the silt particles of larger size (e.g., those larger than about 7–10 microns), which larger particles would clog the pores of the coalescer (pore size about 25 microns), a sand filter 56 is placed upstream or ahead of the coalescer 32. It may be noted at this juncture that smaller size silt (particles smaller than about 7–10 microns, not retained by the said filter 56) will readily pass through the pores of the coalescer 32.

The sand filter 56 is preferably a "Baker Hi-Rate" filter, manufactured by Baker Filtration Company of Huntington Beach, California. The influent for filter 56 is the dewaxed effluent in line 55, and this is fed to the inlet connection of filter 56 by way of a valve 57. The desilted effluent leaves filter 56 by way of a line 58 and is supplied through a valve 59 as the influent for the fine pore coalescer 32.

Periodically, the sand filter 56 is backflushed for a period of 2½ to 3 minutes with clean sea or fresh water, to remove the silt. For this, valves 57 and 59 are closed, valve 60 in a backflush water inlet line 61 is opened, and valve 62 in a backflush water and silt outlet line 63 is opened. The backflushing flow rate is approximately 75% of the maximum forward flow filtration rate. At time intervals of between 6 months and several years, the filter sand in unit or component 56 is replaced, at low cost.

The finely dispersed oil in the watery, desilted effluent from filter 56 is removed in its entirety by the last component in the separation system, the coalescer 32. The separator 8, the ceramic dewaxer 33, and the sand filter 56 all function to properly pre-condition the oily water influent before it is presented to the coalescer 32 for such final and complete separation of the finely dispersed oil in the water. While the separator unit 8 operates primarily on a quantitative basis, the ceramic dewaxer 33 and sand filter 56 operate principally on a qualitative basis, selectively removing those contaminants that are inimical to the continued operation of the coalescer 32.

The preferred embodiment of the coalescer 32 is one having a fine hole size. As mentioned hereinabove, this type of unit is quickly clogged by waxes, asphalts, gums, and similar materials; it is also clogged by silt. Therefore, it is a requirement that the ceramic dewaxer 33 and the sand filter 56 precede this coalescer, in order that a reasonable service life shall ensue.

The construction of the coalescer element may be achieved by precise lathe winding of a monofilament material such as Teflon, nylon, glass fiber, or other material on a perforated tube so as to create a large number of radially-oriented holes of small diameter and long length. Coalescers using this type of construction are available from Selas Flotronics Division of Selas Corporation of America, Spring House, PA The pressurized, deoiled, dewaxed, desilted effluent issuing from the sand filter 56 (via pipe 58 and valve 59) is fed to the inside of the perforated tube, and is forced by the pressure radially outwardly through the small diameter holes. (It may be noted here that a number of these coalescing elements or fiber-wound tubes or cartridges are mounted in the right-hand or inlet end of the shell or tank of coalescer 32.) While traversing these holes, the finely dispersed, microscopic oil globules have their surfaces cleaned or polished as they brush past the monofilament material that lines the hole sides. The combination of surface cleanliness and physical intimacy enforced on the oil globules on their through transit causes them to coalesce into significantly larger globules, which quickly settle out due to density differences after exiting from the fine holes.

It is highly desirable that separator 8 remove the maximum amount of oil from the influent oily water mixture, in order to minimize the resultant "oil loading" of the coalescer 32. This desirability stems from the fact that the finely dispersed microscopic oil droplets in the water have the dirt removed from their surfaces as they traverse the fine hole size pores of the coalescer cartridges. This dirt is retained within the body of the cartridges. As the dirt accumulates, the pressure drop through the cartridges for a given flow rate increases. When the cartridges eventually require a 100 psi pressure drop to maintain the flow rate, they are replaced if not cleanable. Thus, the life of the cartridges is a function of the amount of dirt retained within the cartridges, which in turn is a function of the amount of oil actually handled.

Periodically, on the order of 6 months, the coalescer cartridges (coalescing elements) are replaced, if not cleanable in solvents, at reasonable cost. As explained in the preceding paragraph, the "lifetimes' of these cartridges are sensitive to the rate of actual "dirt loading" that the cartridges experience.

A storage chamber 64 is provided on the top of the tank of coalescer 32, in communication with this tank. A level controller 65 (oil-water interface float control) is located approximately at the midpoint of the length of chamber 64. This controller controls the valve operator 66 of a valve 67 in an air/oil feedback line 68 connected to the top of chamber 64. The line 68 extends to the separator 8.

The coalesced oil droplets and any coalesced air or other gases rise to the top of the storage chamber 64, and accumulate therein. As the oil/water interface moves down, the float control 65 opens the storage chamber valve 67, which results in feeding back the coalesced oil and air to the separator 8. The oil merges with that in the unit 8 and goes out to the oil storage tank 11. The air is vented to the atmosphere, by way of a vent 69 provided on the top of unit 8. The clean water effluent exits from the coalescer, for going overboard, by way of an effluent line 70 connected to the bottom of the coalescer tank, in line with chamber 64. This clean water effluent is sensed by an effluent oil monitor 71 which is coupled into line 70. Monitor 71 is preferably a Bull and Roberts Model 240 Dual Beam oil-in-water detector, having integral sampling cell window self-cleaning capability using steam jets, manufactured by Bull and Roberts, Inc. of Murray Hill, New Jersey. One beam in this device uses ultraviolet radiation to sense the oil content, while the second beam uses visible radiation to sense suspended particulates and thus prevent signal ambiguity. This device can detect as little as 1 part per million oil content and can actuate relays and signal out remotely.

One of the relays actuated by device 71 controls the valve operator 72 for a cut-off valve 73 in line 70.

A bypass line 74, for rejected effluent feedback, branches off from the effluent line 70 between the outlet side of monitor device 71 and the valve 73. Line 74 extends from line 70 to the top of holding tank 12. Another of the relays actuated by device 71 controls the valve operator 75 for a bypass valve 76 in line 74.

A remote indicating signal lamp 77 is also actuated by device 71.

By setting the oil-in-water monitor 71 to trip the relays associated therewith at from 6–10 parts per million of oil, any substandard effluent from coalescer 32, including that experienced during start-up or shutdown, will be automatically reprocessed or recycled (by closing valve 73 and opening valve 76, thus feeding the water effluent from the coalescer back into holding tank 12), and this operating condition will be remotely indicated by lamp 77.

As previously stated, the separator 8 has the capability of completely bypassing to the oil outlet 10 an influent stream comprised 100% of oil. The coalescer 32, independently, also has this capability. In addition, as just described, the effluent oil monitor 71, which senses the oil content of the effluent water stream issuing from the coalescer 32, will cut off the overboard water discharge if its oil content is too high, i.e., above 6–10 parts per million of oil. Thus, the system of this invention is triply protected against random or accidental overboard oil discharges.

Although the ceramic dewaxer has been previously described as utilizing the ceramic pellets 44 in the tube 34 (a cartridge 33), it may be more convenient, in some instances, to omit the cartridge structure and simply utilize the ceramic material, in bulk, in a pressure vessel. From a materials handling standpoint, this latter expedient might be more economical.

The invention claimed is:

1. A system for removing both oil and particulate contaminants from a flowing stream of liquid which is to be disposed of as waste, which comprises in sequence, a dewaxer consisting of a fixed bed containing a plurality of discrete bodies of a porous ceramic material compacted together in random arrangement as a packing which acts to constrain said flowing stream back and forth through said compacted ceramic material and to absorb waxes, asphalts, and like hydrocarbon materials, means to remove particulate matter, and a fine hole size coalescer operating to effect a separation of dispersed fine droplets of oil from said flowing stream.

2. A system for removing both oil and particulate contaminants from a flowing stream of an oily water liquid mixture in which the water portion is to be disposed of as waste, which comprises in sequence, a gravity type oil-water separator to make a rough separation of oil from the oily water, a dewaxer consisting of a fixed bed containing a plurality of discrete bodies of a porous ceramic material compacted together in random arrangement as a packing which acts to constrain said flowing stream back and forth through said compacted ceramic material and to absorb waxes, asphalts, and like hydrocarbon materials, means to remove particulate matter, and a fine hole size coalescer operating to effect a separation of dispersed fine droplets of oil from said flowing stream.

3. The system of claim 2 where the means to remove particulate matter is a sand filter.

4. The system of claim 2 wherein the porous ceramic material is a fired, unglazed clay.

5. The system of claim 4 where the ceramic material is a pellet of cylindrical configuration.

6. A process for removing both oil and particulate contaminants from a flowing stream of liquid which is to be disposed of as waste, which comprises:
   a. passing said stream through a fixed bed of a porous medium consisting of a plurality of discrete bodies of a porous ceramic material compacted together in random arrangement as a packing which acts to constrain said flowing stream back and forth through said compacted ceramic material and acts as a dewaxer to absorb waxes, asphalts, and the like hydrocarbon materials,
   b. passing said stream through means to remove particulate material,
   c. passing said stream from said particulate removing means through a fine hole size coalescer operating to effect a separation of dispersed fine droplets of oil from said flowing stream,
   d. passing the separated oil from said coalescer into a storage tank, and,
   e. passing the substantially oil-free water from said coalescer to waste.

7. A process for removing both oil and particulate contaminants from a flowing stream of an oily-water liquid mixture in which the water portion is to be disposed of as waste, which comprises:
   a. passing said stream through a gravity type oil-water separator to make a rough separation of oil from the oily water,
   b. passing said stream from said gravity separator through a porous medium consisting of a plurality of discrete bodies of a porous ceramic material compacted together in random arrangement as a packing which acts as a dewaxer to absorb waxes, asphalts, and like hydrocarbon materials,
   c. passing said dewaxed stream through a sand filter to remove particulate matter,
   d. passing said stream from said sand filter through a fine hole size coalescer operating to effect a separation of dispersed fine droplets of oil from said flowing stream,
   e. passing the separated oil from said coalescer into a storage tank, and,
   f. passing the substantially oil-free water from said coalescer to waste.

8. The process of claim 7 where the porous ceramic material is a fired, unglazed clay.

9. The process of claim 8 where the ceramic is a pellet of cylindrical configuration.

* * * * *